(12) United States Patent
Tatsugi et al.

(10) Patent No.: US 11,249,320 B2
(45) Date of Patent: Feb. 15, 2022

(54) DIFFRACTIVE OPTICAL ELEMENT AND VIRTUAL IMAGE DISPLAY DEVICE

(71) Applicant: SEIKO EPSON CORPORATION, Tokyo (JP)

(72) Inventors: Hiroyuki Tatsugi, Chino (JP); Toshiyuki Noguchi, Shiojiri (JP); Atsushi Saito, Chino (JP)

(73) Assignee: SEIKO EPSON CORPORATION, Tokyo (JP)

(*) Notice: Subject to any disclaimer, the term of this patent is extended or adjusted under 35 U.S.C. 154(b) by 269 days.

(21) Appl. No.: 16/287,764

(22) Filed: Feb. 27, 2019

(65) Prior Publication Data

US 2019/0265483 A1 Aug. 29, 2019

(30) Foreign Application Priority Data

Feb. 28, 2018 (JP) .............................. JP2018-034415

(51) Int. Cl.
*G02B 27/01* (2006.01)
*G02B 27/42* (2006.01)

(52) U.S. Cl.
CPC ...... *G02B 27/4205* (2013.01); *G02B 27/0172* (2013.01); *G02B 2027/0105* (2013.01); *G02B 2027/0174* (2013.01); *G02B 2027/0178* (2013.01); *G03H 2250/00* (2013.01); *G03H 2250/35* (2013.01); *G03H 2250/39* (2013.01)

(58) Field of Classification Search
CPC .......... G03H 2250/00; G03H 2250/35; G03H 2250/39; G02B 27/0172; G02B 27/4205; G02B 2027/0105; G02B 2027/0174; G02B 2027/0178; G02B 1/14
See application file for complete search history.

(56) References Cited

U.S. PATENT DOCUMENTS

| | | | | |
|---|---|---|---|---|
| 5,631,107 A | * | 5/1997 | Tarumi | G03H 1/0252 156/230 |
| 2003/0104155 A1 | * | 6/2003 | Morii | G03H 1/0256 428/40.1 |
| 2013/0070344 A1 | | 3/2013 | Takeda et al. | |
| 2016/0161755 A1 | * | 6/2016 | Yonekubo | G02B 27/0081 345/8 |

FOREIGN PATENT DOCUMENTS

| | | |
|---|---|---|
| JP | S64-040882 A | 2/1989 |
| JP | H05-249317 A | 9/1993 |
| JP | H09-090130 A | 4/1997 |
| JP | 2008-139768 A | 6/2008 |
| JP | 2013-061593 A | 4/2013 |
| JP | 2014-035395 A | 2/2014 |

* cited by examiner

*Primary Examiner* — George G. King
(74) *Attorney, Agent, or Firm* — JCIPRNET

(57) ABSTRACT

A diffractive optical element according to the invention includes a holographic element configured to deflect incident light, a first substrate provided on one surface side of the holographic element, a first dielectric film provided between the first substrate and the holographic element, a second dielectric film provided on another surface side of the holographic element, and a third dielectric film provided on a side surface side of the holographic element.

5 Claims, 12 Drawing Sheets

DIFFRACTIVE OPTICAL ELEMENT AND VIRTUAL IMAGE DISPLAY DEVICE

BACKGROUND

1. Technical Field

The present invention relates to a diffractive optical element and a virtual image display device.

2. Related Art

A head-mounted display (HMD) is known as a display device directly irradiating retinas through pupils with a laser beam to cause a user to visually recognize an image.

In general, the head-mounted display includes an image formation unit for forming image light and a visual recognition unit for deflecting and emitting the image light, which is formed by the image formation unit, to the eyes (pupils) of the user. For example, such head-mounted display enables the user to visually recognize both of an outside scene and the image light emitted from the image formation unit through the visual recognition unit, at the same time.

In such head-mounted display, for example, the visual recognition unit including a holographic element is used. By the diffraction of the light at the holographic element, the image light formed by the image formation unit is deflected toward the eyes of the user. As a result, the image light is visually recognized by the user.

Here, in a case where a volume hologram is used as the holographic element for deflecting the image light, the volume hologram includes flat interference stripes formed of a low-refractive layer and a high-refractive layer. The image light is deflected by the interference stripes.

However, when moisture enters the volume hologram having such configuration, the volume hologram expands, and positions of the interference stripes are thus deviated. Accordingly, there arises a problem in that the deflection characteristics of the volume hologram are degraded.

JP-A-5-249317 and JP-A-2008-139768 propose that, for the purpose of preventing degradation of the deflection characteristics of the volume hologram, a dielectric film as a water vapor barrier layer is formed on the volume hologram. Particularly, JP-A-2008-139768 proposes that the dielectric film (water vapor barrier layer) is formed on each of an upper surface side and a lower surface side of the volume hologram.

However, even when the dielectric film is formed on each side of the volume hologram, in actuality, it cannot be said that the degradation of the deflection characteristics of the volume hologram, which is caused by the entry of moisture, is properly prevented.

Note that, such problem arises not only with the holographic element formed of the volume hologram but also with a holographic element formed of, for example, a surface relief hologram or a blazed diffraction lattice.

SUMMARY

The invention is made to address the above-described issues, and can be realized as the following application examples.

A diffractive optical element according to an application example of the invention includes a holographic element configured to deflect incident light, a first substrate provided on one surface side of the holographic element, a first dielectric film provided between the first substrate and the holographic element, a second dielectric film provided on another surface side of the holographic element, and a third dielectric film provided on a side surface side of the holographic element.

It is preferred that the diffractive optical element according to an application example of the invention further includes a second adhesive layer provided between the second dielectric film and the holographic element, and a third adhesive layer provided between the third dielectric film and the holographic element, wherein the second adhesive layer and the third adhesive layer are integrally formed.

In the diffractive optical element according to an application example of the invention, it is preferred that the second dielectric film and the third dielectric film be integrally formed.

It is preferred that the diffractive optical element according to an application example of the invention further includes a second substrate provided on the other surface side of the holographic element, wherein the second dielectric film is arranged between the second substrate and the holographic element.

In the diffractive optical element according to an application example of the invention, it is preferred that the second substrate includes a wall portion standing upright along an edge portion on the one surface side, and the third dielectric film is formed on an inner periphery surface side of the wall portion.

It is preferred that the diffractive optical element according to an application example of the invention further includes a fourth dielectric film provided on the one surface side of the first substrate, and a fifth dielectric film provided on the other surface side of the second substrate, wherein the third dielectric film, the fourth dielectric film, and the fifth dielectric film are integrally formed, and the third dielectric film, the fourth dielectric film, and the fifth dielectric film, which are integrally formed, cover all surfaces of a laminated body including the holographic element, the first dielectric film, the first substrate, the second dielectric film, and the second substrate.

It is preferred that the diffractive optical element according to an application example of the invention further includes a first hard coat layer provided between the first substrate and the fourth dielectric film, a second hard coat layer provided between the second substrate and the fifth dielectric film, and a third hard coat layer provided between the side surface side of the laminated body and the third dielectric film.

The virtual image display device according to an application example of the invention includes the diffractive optical element according to the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

Now, preferred exemplary embodiments of a diffractive optical element and a virtual image display device according to the invention are described with reference to the accompanying drawings illustrating the preferred exemplary embodiments.

First, before description of the diffractive optical element according to the invention, description is made of a head-mounted display (HMD) to which a virtual image display device (virtual image display device according to the invention) including the diffractive optical element according to the invention is applied.

Figure 1:
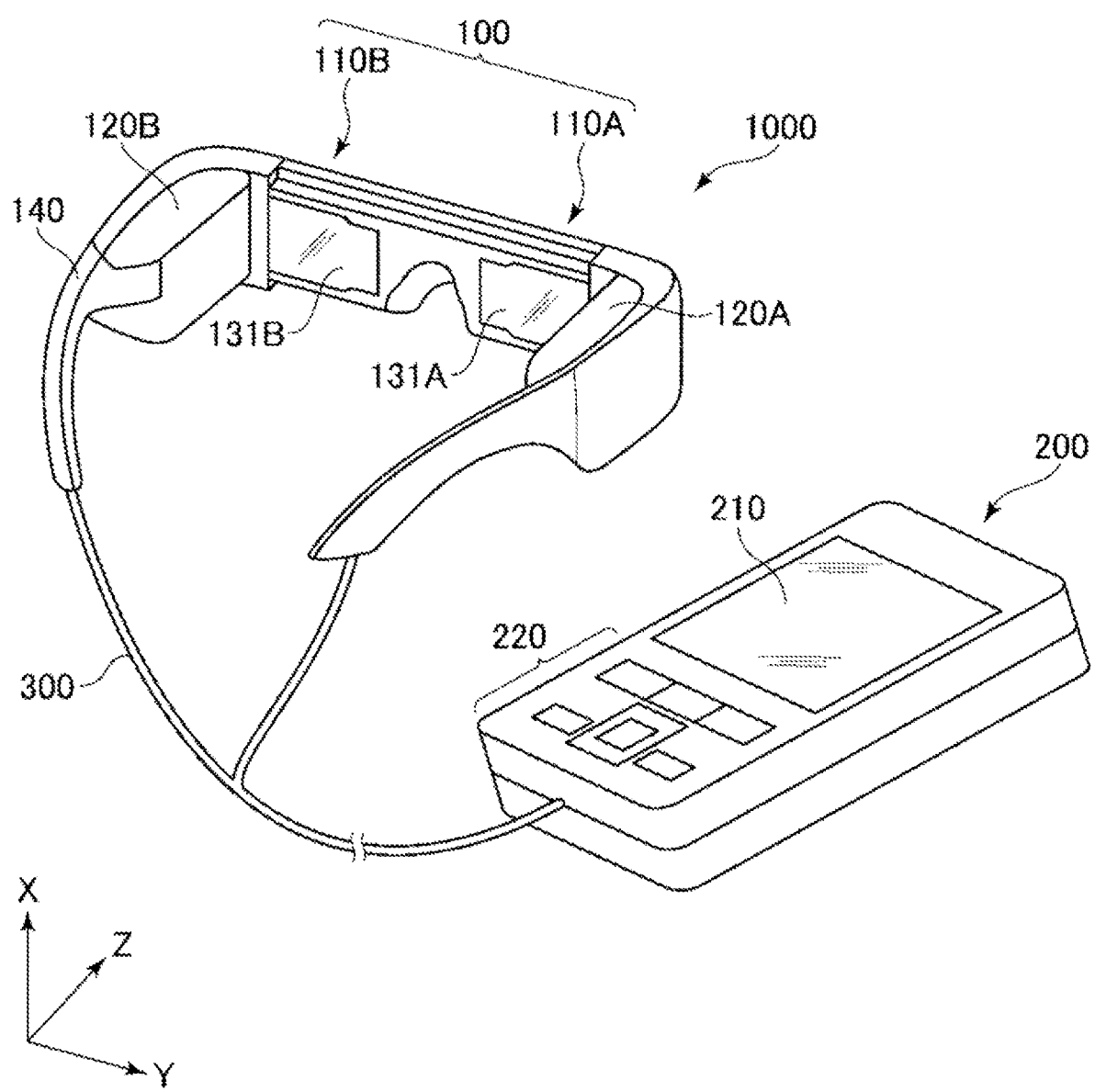
FIG. 1 a schematic perspective view for illustrating an overall image of exemplary embodiments in a case where the invention is applied to a head-mounted display (HMD) as a virtual image display device including a diffractive optical element according to the invention.
Figure 2:
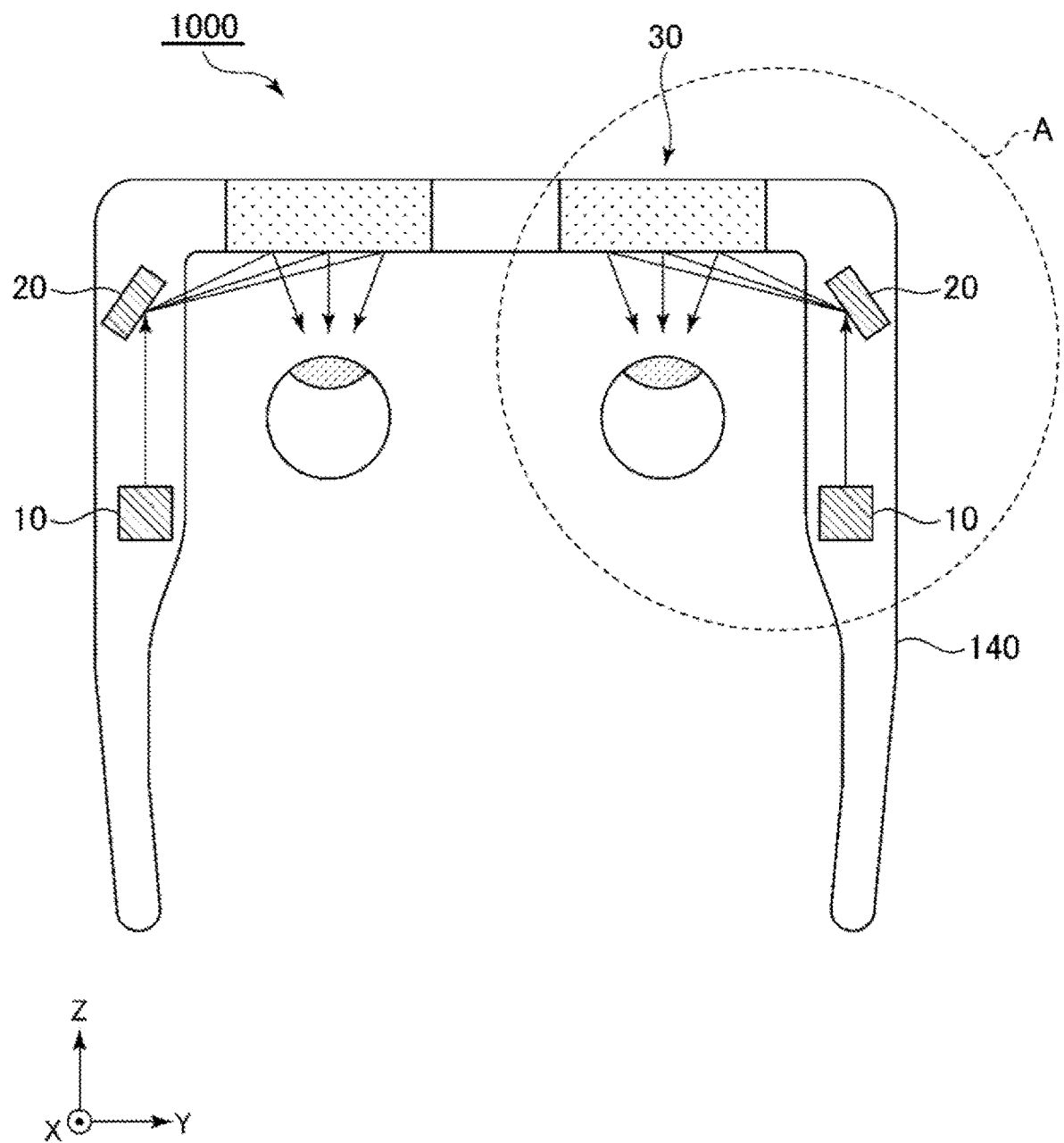
FIG. 2 is a schematic plan view when the head-mounted display illustrated in FIG. 1 is viewed from above.
Figure 3:
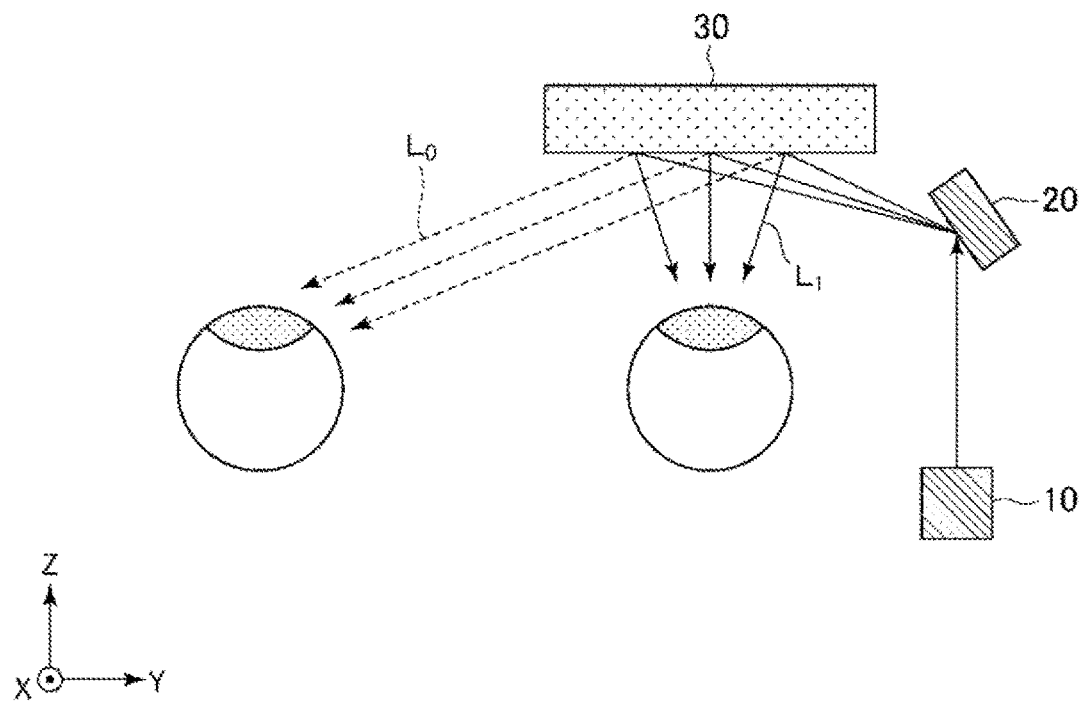
FIG. 3 is a schematic plan view for illustrating a configuration of an image display device in the part A of the head-mounted display illustrated in FIG. 2 in an enlarged manner.
Figure 4:
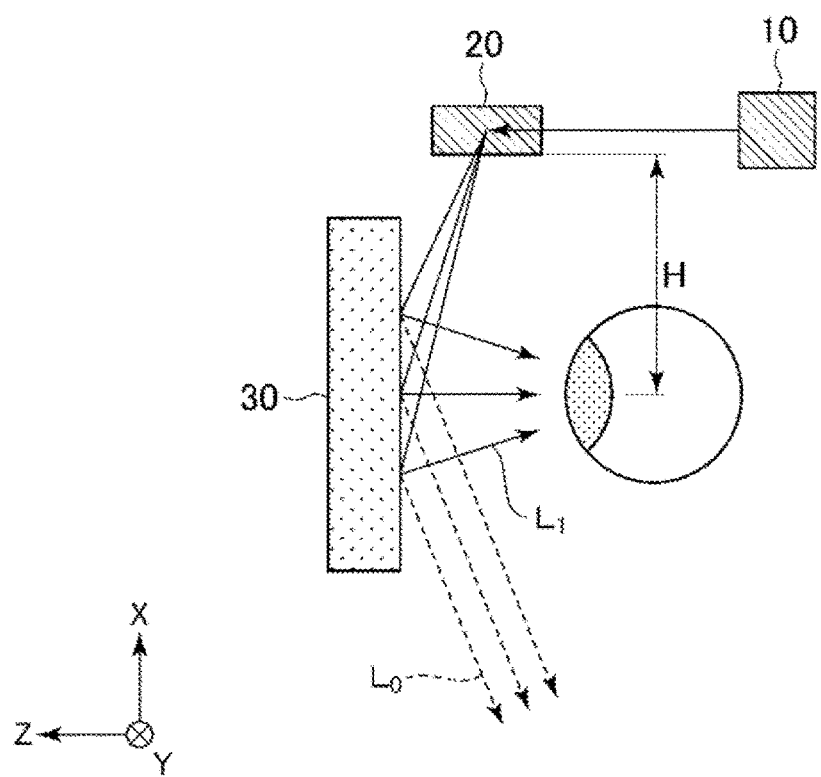
FIG. 4 is a schematic side view for illustrating the configuration of the image display device in the part A of the head-mounted display illustrated in FIG. 2 in an enlarged manner.

FIG. 1 a schematic perspective view for illustrating an overall image of exemplary embodiments in the case where the invention is applied to the head-mounted display (HMD) as the virtual image display device including the diffractive optical element according to the invention. FIG. 2 is a schematic plan view when the head-mounted display illustrated in FIG. 1 is viewed from above. FIG. 3 is a schematic plan view for illustrating a configuration of an image display device in the part A of the head-mounted display illustrated in FIG. 2 in an enlarged manner. FIG. 4 is a schematic side view for illustrating the configuration of the image display device in the part A of the head-mounted display illustrated in FIG. 2 in an enlarged manner. Note that, in the following description, for easy understanding of the description, an upper side, a lower side, a sheet front side, a sheet depth side, a right side, and a left side in FIG. 2 are referred to as "front (Z direction)", "rear (−Z direction)", "upper (X direction)", "lower "−X direction)", "right (Y direction)", and "left (−Y direction)", respectively. In other words, in the following description, a longitudinal direction of a diffractive optical element 30 described later (height direction of a frame 140), a transverse direction of the diffractive optical element 30 (width direction of a visual recognition unit 131A), and a thickness direction of the diffractive optical element 30 (thickness direction of the visual recognition unit 131A) are indicated as "±X direction", "±Y direction", and "±Z direction", respectively.

As illustrated in FIG. 1, a head-mounted display 1000 includes a main body unit 100 having a shape of glasses and a controller 200 having a size holdable by a hand of a user.

In this exemplary embodiment, the main body unit 100 and the controller 200 are connected by a cable 300 to be communicable with each other by wire. Further, the main body unit 100 and the controller 200 transmit an image signal and a control signal through the cable 300. Note that, the main body unit 100 and the controller 200 are only required to be connected to be communicable, and may be connected by wire as illustrated in FIG. 1 or by wireless.

The main body unit 100 includes a right-eye display unit 110A and a left-eye display unit 110B. The right-eye display unit 110A includes an image formation unit 120A for forming an image light for a right-eye image. The left-eye display unit 110B includes an image formation unit 120B for forming an image light for a left-eye image.

In the frame 140 of the main body unit 100 having the shape of glasses, the image formation unit 120A is stored in a temple portion (right side) of the glasses whereas, in the frame 140 of the main body unit 100 having the shape of glasses, the image formation unit 120B is stored in a temple portion (left side) of the glasses.

The visual recognition unit 131A being light transmissive is provided at a position corresponding to a lens (right side) of the glasses in the main body unit 100. The visual recognition unit 131A emits the image light for the right-eye image to a right eye (one eye) of the user. Further, in the head-mounted display 1000, the visual recognition unit 131A is light transmissive, and the right eye can visually recognize the periphery through the visual recognition unit 131A.

Further, a visual recognition unit 131B being light transmissive is provided at a position corresponding to a lens (left side) of the glasses in the main body unit 100. The visual recognition unit 131B emits the image light for the left-eye image to a left eye (the other eye) of the user. Further, in the head-mounted display 1000, the visual recognition unit 131B is light transmissive, and the left eye can visually recognize the periphery through the visual recognition unit 131B.

As described above, in this exemplary embodiment, the head-mounted display 1000 is an augmented reality (AR) type HMD enabling the eyes to visually recognize the periphery through the visual recognition units 131A and 131B.

The controller 200 includes an operation unit 210 and an operation button unit 220. The user performs operation input with respect to the operation unit 210 and the operation button unit 220 of the controller 200, and gives instructions to respective components included in the main body unit 100.

As illustrated in FIG. 2, in the head-mounted display 1000 having such configuration, each of the image formation unit 120A arranged (stored) in the temple portion (right side) of the frame 140 and the image formation unit 120B arranged in the temple portion (left side) of the frame 140 includes a light source 10 and a scanning mirror 20.

Further, each of the visual recognition unit 131A provided at the position corresponding to the lens (on the right side) and the visual recognition unit 131B provided at the position corresponding to the lens (on the left side) includes the diffractive optical element 30 for displaying an image on the retina of the right eye or the left eye of the user.

In this exemplary embodiment, each light source 10 emits semiconductor laser light being laser light obtained by combining laser light from a red laser light source, laser light from a blue laser light source, and laser light from a green laser light source. Further, an arbitrary color of laser light is output by properly modulating an output from each color laser light source. Further, an image can be displayed on the retina of the eye of the user by performing modulation in association of the scanning mirror 20 and the like described later.

Each scanning mirror 20 includes a mirror and an oscillation control unit for controlling oscillation of the mirror with a certain frequency. The oscillation control unit is formed of, for example, an MEMS. Constituting the oscillation control unit by the MEMS as described above enables downsizing of the scanning mirror 20.

Note that, in place of the light source 10 and the scanning mirror 20, each of the image formation unit 120A and 120B may include an image display element emitting the image light containing image information and a reflecting mirror for guiding the emitted image light to (causing the emitted image light to enter) the diffractive optical element 30. Further, in this case, the image display element is not particularly limited as long as the image display element can emit the image light containing the image information. Examples of the image display element include a liquid crystal display (LCD) element irradiated with back light such as a light emitting diode (LED), an organic light emitting diode (OLED) element, and a two-dimensional image display element such as a display element in which a plurality of micro LEDs are arranged in a lattice shape on a plane.

In this exemplary embodiment, each diffractive optical element 30 displays an image on the retina of the eye of the user by deflecting (reflecting) the light emitted from the corresponding light source 10 via the corresponding scanning mirror 20.

A diffractive optical element according to the invention is applied to the diffractive optical element 30. Constituting the diffractive optical element 30 by the diffractive optical element according to the invention properly suppresses or prevents entry of moisture into a holographic element 310 included in the diffractive optical element 30. Thus, the degradation of the deflection characteristics, which is caused by moisture absorption of the holographic element 310, can properly be suppressed or prevented. Now, detailed description is made of the diffractive optical element 30.

First Exemplary Embodiment

First, the diffractive optical element 30 according to a first exemplary embodiment is described.

Figure 5:
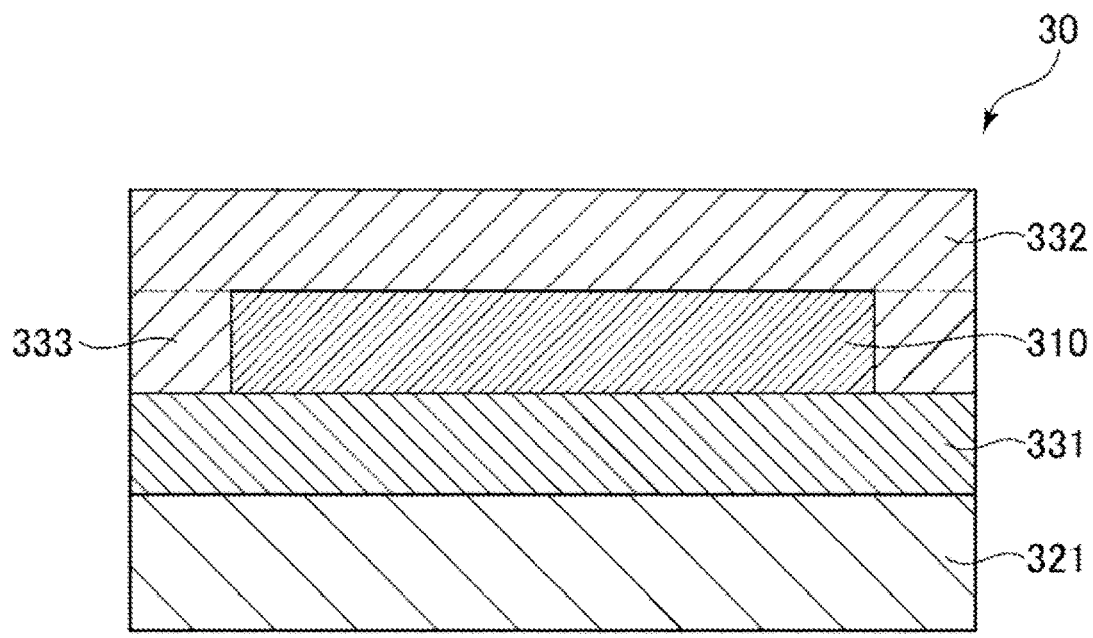
FIG. 5 is a longitudinal cross-sectional view for schematically illustrating a diffractive optical element according to a first exemplary embodiment of the invention.
Figure 6:
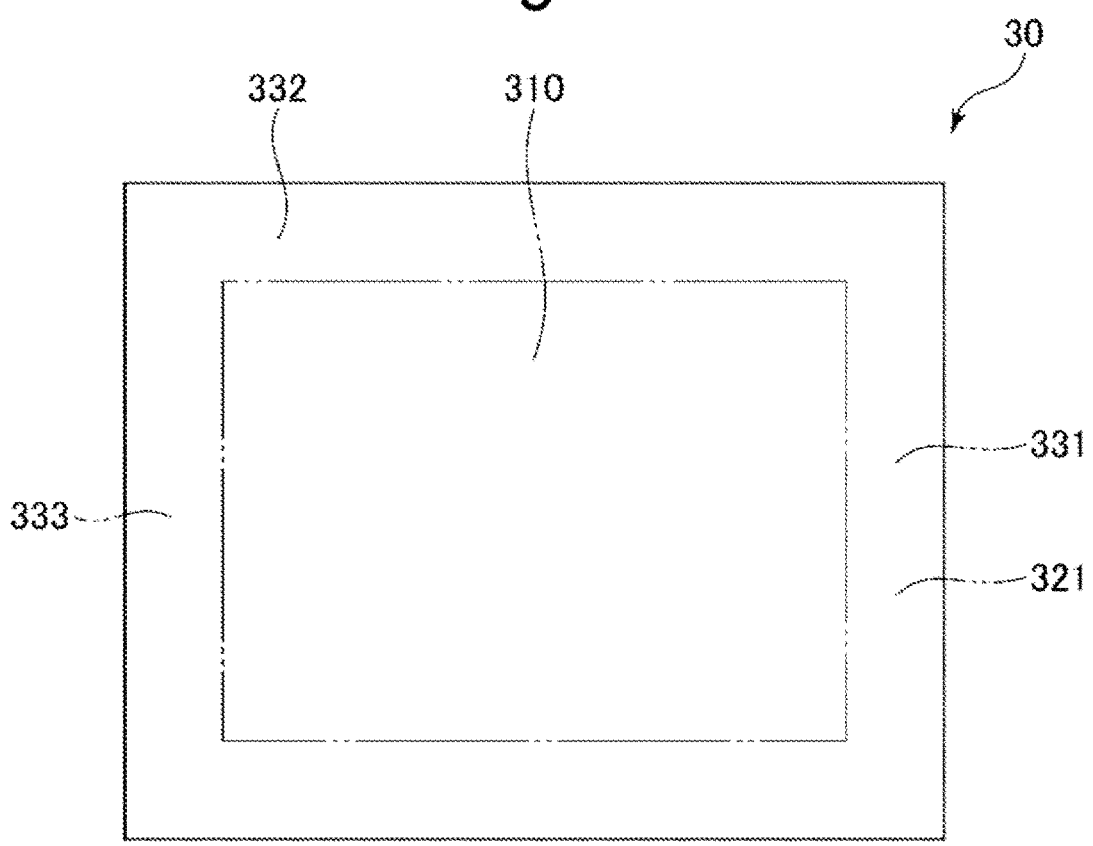
FIG. 6 is a plan view for schematically illustrating the diffractive optical element according to the first exemplary embodiment of the invention.
Figure 7:
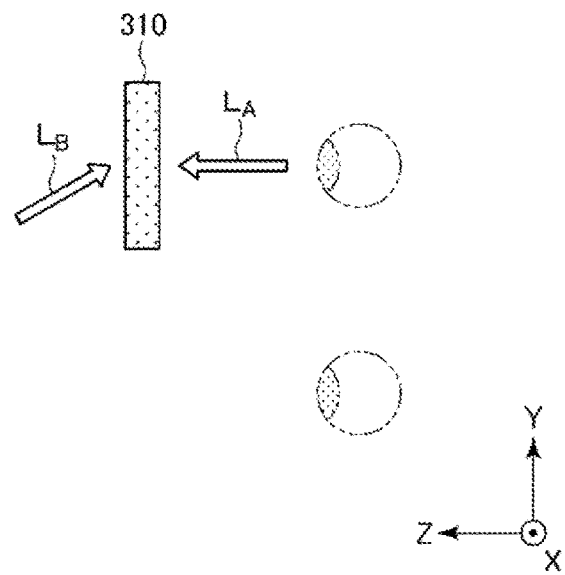
FIG. 7 is a schematic plan view for illustrating a manufacturing method of a holographic element.
Figure 8:
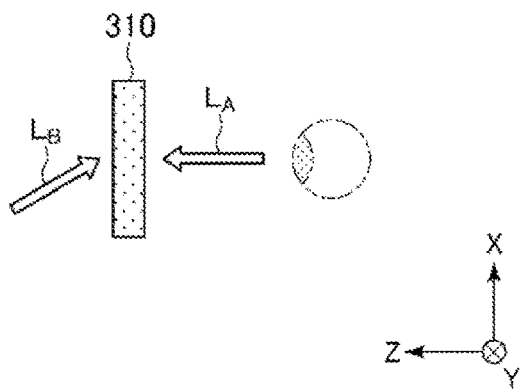
FIG. 8 is a schematic side view for illustrating the manufacturing method of the holographic element.
Figure 9:
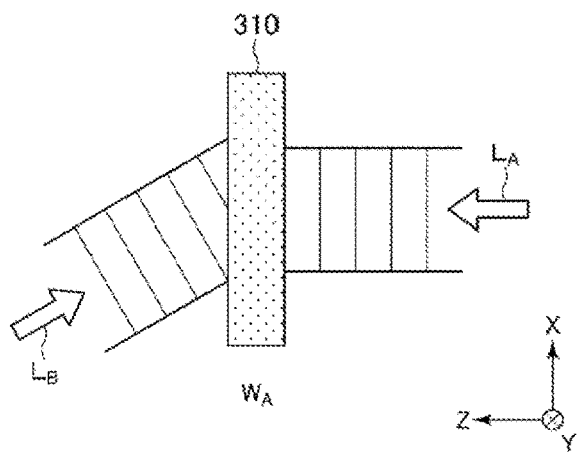
FIG. 9 is a schematic view for illustrating an exposure method (exposure arrangement) for exposing the holographic element through use of a plane wave.
Figure 10:
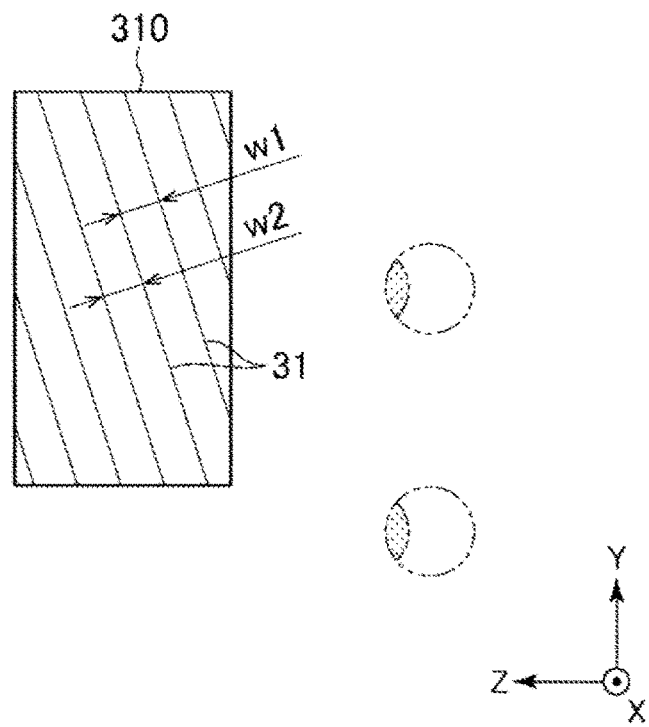
FIG. 10 is a schematic plan view for illustrating a pattern of interference stripes of the holographic element.
Figure 11:
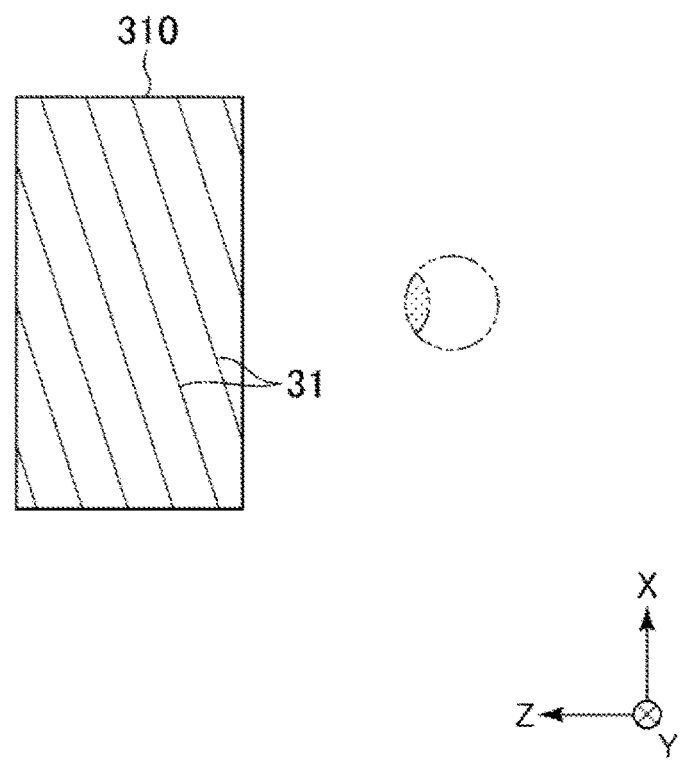
FIG. 11 is a schematic side view for illustrating the pattern of the interference stripes of the holographic element.

FIG. 5 is a longitudinal cross-sectional view for schematically illustrating the diffractive optical element according to the first exemplary embodiment of the invention. FIG. 6 is a plan view for schematically illustrating the diffractive optical element according to the first exemplary embodiment of the invention. Each of FIG. 7 and FIG. 8 is a schematic view for illustrating a manufacturing method of the holographic element. FIG. 9 is a schematic view for illustrating an exposure method (exposure arrangement) for exposing the holographic element through use of a plane wave. Each of FIG. 10 and FIG. 11 is a schematic view for illustrating a pattern of interference stripes of the holographic element. Note that, in the following description, for easy understanding of the description, an upper side and a lower side in FIG. 5 are referred to as "upper" and "lower", respectively. A left side, a right side, a sheet front side, a sheet depth side, an upper side, and a lower side in FIG. 7 are referred to as "front (Z direction)", "rear (−Z direction)", "upper (X direction)", "lower (−X direction)", "right (Y direction)", and "left (−Y direction)", respectively.

In this exemplary embodiment, as illustrated in FIG. 5 and FIG. 6, the diffractive optical element 30 includes a first substrate 321, a first dielectric film 331, the holographic element 310, a second dielectric film 332, and a third dielectric film 333, and is formed of a laminated body in which the first substrate 321, the first dielectric film 331, the holographic element 310, and the second dielectric film 332 are laminated in the stated order from a lower side to an upper side of the diffractive optical element 30. In the laminated body, the third dielectric film 333 is provided so as to cover side surfaces of the holographic element 310.

In the diffractive optical element 30, the first dielectric film 331 is formed so as to cover almost an entire upper surface (the other surface) of the first substrate 321. The holographic element 310 is arranged at a center portion of the first dielectric film 331 without covering an edge portion of the first dielectric film 331. Further, the second dielectric film 332 covers an upper surface of the holographic element 310 arranged at the center portion of the first dielectric film 331. Further, the third dielectric film 333 covers the side surfaces of the holographic element 310 so that the first dielectric film 331, the second dielectric film 332, and the third dielectric film 333 seal the holographic element 310.

In this exemplary embodiment, the second dielectric film 332 positioned in a region covering the upper surface of the holographic element 310 and the third dielectric film 333 positioned in a region covering the side surfaces of the holographic element 310 are integrally provided so as to have a recessed shape, which stores the holographic element 310 and opens downward.

In the diffractive optical element 30 described above, the first dielectric film 331, the second dielectric film 332, and the third dielectric film 333 cover the upper surface (the other surface), the lower surface (the one surface), and the side surfaces of the holographic element 310 so as to perform sealing. In this manner, the entry of moisture into the holographic element 310 can appropriately be suppressed or prevented. Thus, the moisture absorption degradation, which is caused by moisture absorption of the holographic element 310, can properly be suppressed or prevented.

Now, respective components forming the diffractive optical element 30 are sequentially described.

Note that, in this specification, a surface on a lower side (lower surface) of each component of the diffractive optical element 30 is indicated as one surface, and a surface on an upper side (upper surface) of each component is indicated as the other surface.

The first substrate 321 is provided on the lower surface side of the holographic element 310 through intermediation of the first dielectric film 331 to support the holographic element 310, the first dielectric film 331, the second dielectric film 332, and the third dielectric film 333. In order to deflect the light, which is emitted from the light source 10, at the holographic element 310, it is preferred that the first substrate 321 be substantially transparent (colorless and transparent, colored and transparent, or semi-transparent).

As a material forming the first substrate 321, for example, a resin material such as polyethylene terephthalate, polyethylene naphthalate, polypropylene, cycloolefin polymer, polyamide, polyether sulfone, polymethyl methacrylate, polycarbonate, and polyalylate, and a glass material such as quartz glass and soda glass are exemplified. One, two or more kinds of those may be used in combination.

An average thickness of the first substrate 321 described above is not particularly limited, but it is preferred that the thickness be approximately from 0.5 mm to 5 mm, more preferably, approximately from 0.7 mm to 2 mm.

The holographic element 310 (diffraction optical element) displays an image on the retina of the eye of the user by deflecting (reflecting) the light, which is emitted from the light source 10 and enters the holographic element 310, and has the upper surface and the lower surface both of which are in a flat plate-like shape. In this exemplary embodiment, the holographic element 310 is formed of a volume hologram, and is placed on the upper surface side of the first substrate 321 through intermediation of the first dielectric film 331, and deflects the light from the light source 10 via the first substrate 321 and the first dielectric film 331. Constituting the holographic element 310 by the volume hologram allows the light entering the diffractive optical element 30 to be diffracted at relatively high efficiency.

The volume hologram (the holographic element 310) has a refractive index distribution within the resin layers. For example, as schematically illustrated in FIG. 10 and FIG. 11, flat interference stripes 31 formed of a low-refractive layer and a high-refractive layer are illustrated (see FIG. 10 and FIG. 11).

In a case where a general mirror is used, only regular reflection light can advance. Meanwhile, when the diffractive optical element 30 including the holographic element 310 formed of the volume hologram described above is used, as illustrated in FIG. 3, the light can be changed (deflected) not only in a regular reflection direction but also in an arbitrary direction. Further, as compared to a general mirror, downsizing of the holographic element 310 can be achieved and this results in downsizing of the diffractive optical element 30.

Further, as illustrated in FIG. 4, the diffractive optical element 30 (the holographic element 310) is arranged right opposite to the eye, and the holographic element 310 is designed so that the light from the scanning mirror 20 is diffracted to turn into primary diffracted light $L_1$ and enters the right eye.

Further, in this exemplary embodiment, the scanning mirror 20 is arranged at a position other than a position in a plane (YZ plane) containing the Z axis perpendicular to the center of the eye and the Y axis connecting the centers of the eyes with each other. In this exemplary embodiment, the scanning mirror 20 is arranged at a height H being a position higher than the YZ plane (the height of the eye). Specifically, for example, when a pupil diameter is 4 mm, the scanning mirror 20 is arranged at the height H away from the center of the eye by at least 2 mm or greater. Note that, for example, an upper limit of the height away from the center of the eye falls within a range enabling the head-mounted display 1000 to function. With this arrangement, zero-order diffracted light $L_0$ among the incident light entering the holographic element 310 from the scanning mirror 20 advances in a direction at a height different from the left eye, and as a result, does not enter the left eye.

Meanwhile, the primary diffracted light $L_1$ among the incident light entering the diffractive optical element 30 (the holographic element 310) from the scanning mirror 20 enters the right eye. Accordingly, the image can be recognized. Note that, the directions of the zero-order diffracted light $L_0$ and the primary diffracted light $L_1$ can be adjusted by the configuration of the exposure optical system that is used at the time of manufacturing the holographic element 310.

The holographic element 310 included in the diffractive optical element 30 described above, that is, the volume hologram having the flat interference stripes 31 formed of a low-refractive layer and a high-refractive layer can be formed by, for example, interference exposure of two light fluxes containing object light $L_A$ and reference light $L_B$ (see FIG. 7 and FIG. 8).

Specifically, one surface of the holographic element 310, which is to be formed, is exposed with the object light $L_A$ having a plane wave $W_A$, and the other surface is exposed with the reference light $L_B$ having the plane wave $W_A$ so as to cross the object light $L_A$ (see FIG. 9). Further, an angle at which the object light $L_A$ and the reference light $L_B$ cross with each other determines the characteristics of the formed holographic element 310 (the volume hologram).

Note that, as an exposure method, as illustrated in FIG. 9, the example using the plane wave $W_A$ is given. As described above, in a case of recording with the plane wave $W_A$, as illustrated in FIG. 10, an angle of the interference stripes 31 of the holographic element 310 is recorded at an angle other than a perpendicular angle with respect to the Z axis in the hologram as a whole. Further, the plane wave $W_A$ is used. Thus, the recorded interference stripes 31 are also liner (flat). Note that, in the exposure, in place of the plane wave $W_A$ illustrated in FIG. 9, a spherical wave may be used.

The interference stripes 31 is illustrated in a schematic view of a photopolymer portion in an enlarged view in each of FIG. 10 and FIG. 11. In the interference stripes 31, the refractive index distribution appears in oblique lines. That is, the high-refractive layer and the low-refractive layer are alternately distributed. Further, a width w1 of the high-refractive layer and a width w2 of the low-refractive layer are substantially the same. The width of each of the interference stripes 31 is set to, for example, approximately from 400 nm to 800 nm.

As described above, the interference stripes 31 of the holographic element 310 are formed to be oblique when viewed from above (see FIG. 10) and from a side (see FIG. 11).

Here, for example, when the holographic element 310 having the above-mentioned configuration, in other words, the volume hologram having the flat interference stripes 31 formed of a low-refractive layer and a high-refractive layer, which is formed by the interference exposure of the two light fluxes containing the object light $L_A$ and the reference light $L_B$, is formed directly on the first substrate 321 without providing the first dielectric film 331, the second dielectric film 332, and the third dielectric film 333, the following problem may arise. That is, when moisture enters the volume hologram, and the volume hologram expands due to the moisture entering, this causes deviation of the positions of the interference stripes. Accordingly, there arises a problem in that the deflection characteristics of the volume hologram are degraded.

In contrast, in the invention, the diffractive optical element 30 includes the first dielectric film 331, which is provided between the first substrate 321 and the holographic element 310, that is, on the lower surface (the one surface) side of the holographic element 310, the second dielectric film 332, which is provided on the upper surface (the other surface) side of the holographic element 310, and the third dielectric film 333, which is provided on the side surface side of the holographic element 310. With this structure, the first dielectric film 331, the second dielectric film 332, and the third dielectric film 333 seal the holographic element 310. The first dielectric film 331, the second dielectric film 332, and the third dielectric film 333 can exert a function as a water vapor barrier layer for suppressing or preventing the entry of moisture (water vapor) into the holographic element 310. Thus, the moisture can be properly suppressed or prevented from entering the holographic element 310. Accordingly, even when the holographic element 310 expands and the positions of the interference stripes 31 are deviated, the degradation of the deflection characteristics of the holographic element 310 due to the expansion and the deviation can properly be suppressed or prevented.

Note that, in place of the volume hologram described in this exemplary embodiment, the holographic element 310 may be, for example, a surface relief hologram or a blazed diffraction lattice.

Further, a resin layer may be formed so as to be interposed between the upper surface of the holographic element 310 and the second dielectric film 332. The resin layer is formed of a thermoplastic resin such as polyethylene terephthalate, polycarbonate, polyamide, and triacetylcellulose.

The first dielectric film 331 is provided between the first substrate 321 and the holographic element 310, that is, on the lower surface side of the holographic element 310, and exerts a function as a water vapor barrier layer for suppressing or preventing the entry of moisture from the lower surface side of the holographic element 310.

Further, in order to deflect the light, which is emitted from the light source 10, at the holographic element 310, it is preferred that the first dielectric film 331 be substantially transparent (colorless and transparent, colored and transparent, or semi-transparent).

The constituting material of the first dielectric film 331 is not particularly limited as long as the constituting material is dielectric and can provide the first dielectric film 331 with a water vapor barrier property and transparency. For example, an inorganic material such as a ceramic material and a glass material and a resin material are exemplified, and one, two or more kinds of those may be used in combination. Particularly, the ceramic material is preferred. With this, the obtained first dielectric film 331 can be securely caused to exert a function as the above-mentioned first dielectric film 331.

As the ceramic material, for example, alumina, zirconia, magnesia, silica, silicon monoxide, titania, hafnium oxide, aluminum nitride, silicon nitride, silicon carbide, and barium titanate are exemplified, and one, two or more kinds of those may be used in combination. Of those, silicon monoxide (SiO), silica ($SiO_2$), alumina ($Al_2O_3$), hafnium oxide ($HfO_2$), zirconia ($ZrO_2$), and titania ($TiO_2$) are preferred. With those materials, the above-mentioned effects obtained through use of the ceramic material can be exerted more prominently. Further, the first dielectric film 331 formed of the ceramic material can be formed relatively easily by a vacuum evaporation method, sputtering, ion plating, and a vapor growth method such as plasma chemical vapor growth method.

Note that, as the glass material, for example, quartz glass and borosilicate glass are exemplified.

Further, as the resin material, for example, polyvinyl chloride, polyethylene, polypropylene, polytetrafluoroethylene, polyethylene terephthalate, polyvinyl fluoride, an epoxy resin, and a phenol resin are exemplified.

Further, the first dielectric film 331 may be a single layer body or a multi-layer body formed of the above-mentioned constituting material, but is preferred to be a multi-layer body. With this, the above-mentioned function as the first dielectric film 331 can be exerted more prominently.

Note that, in a case where the first dielectric film 331 is a multi-layer body formed of the ceramic material, examples of the first dielectric film 331 include a multi-layer body, which includes a layer formed of silicon monoxide (SiO) and a layer formed of alumina ($Al_2O_3$), and has the layer formed of silicon monoxide (SiO) on the first substrate 321 side, and a multi-layer body, which includes a layer formed of silicon monoxide (SiO) and a layer formed of hafnium oxide ($HfO_2$) and has the layer formed of silicon monoxide (SiO) on the first substrate 321.

An average thickness of the first dielectric film 331 is not particularly limited, but it is preferred that the thickness be approximately from 50 nm to 1 μm, more preferably, approximately from 100 nm to 300 nm. When the average thickness of the first dielectric film 331 is smaller than the lower limit value, there may be a possibility in that a sufficient water vapor barrier property cannot be provided to the first dielectric film 331 depending on a kind of the constituting material of the first dielectric film 331. Further, when the average thickness of the first dielectric film 331 exceeds the upper limit value, there may be a possibility that a film crack may be caused to the first dielectric film 331 depending on a kind of the constituting material of the first dielectric film 331.

The second dielectric film 332 is provided on the upper surface side of the holographic element 310, is integrally provided together with the third dielectric film 333 provided on the side surface side of the holographic element 310, and exerts a function as a water vapor barrier layer for suppressing or preventing the entry of moisture from the upper surface side of the holographic element 310.

As the constituting material of the second dielectric film 332, the above-mentioned materials similar to the material exemplified for the first dielectric film 331 may be used. Further, the second dielectric film 332 may be a single layer body or a multi-layer body as long as the constituting materials exemplified for the first dielectric film 331 are used.

Further, similarly to the first dielectric film 331, it is preferred that the average thickness of the second dielectric film 332 be approximately from 50 nm to 1 µm, more preferably, approximately from 100 nm to 300 nm.

The third dielectric film 333 is provided on the side surface side of the holographic element 310, is integrally provided together with the second dielectric film 332 on the upper surface side of the holographic element 310, and exerts a function as a water vapor barrier layer for suppressing or preventing the entry of moisture from the side surface side of the holographic element 310.

As the constituting material of the third dielectric film 333, the above-mentioned materials similar to the material exemplified for the first dielectric film 331 may be used. Further, the third dielectric film 333 may be a single layer body or a multi-layer body as long as the constituting materials exemplified for the first dielectric film 331 are used.

Further, similarly to the first dielectric film 331, it is preferred that the average thickness of the third dielectric film 333 be approximately from 50 nm to 1 µm, more preferably, approximately from 100 nm to 300 nm.

As described above, the first dielectric film 331, the second dielectric film 332, and the third dielectric film 333 are provided on the upper surface side, the lower surface side, and the side surface side of the holographic element 310. Accordingly, the dielectric films 331 to 333 can securely seal the holographic element 310. Thus, moisture is properly suppressed or prevented from entering the holographic element 310. Accordingly, even when the holographic element 310 expands and the positions of the interference stripes 31 are deviated, the degradation of the deflection characteristics of the holographic element 310 due to the expansion and the deviation can properly be suppressed or prevented.

Further, it is preferred that water vapor permeability of the first dielectric film 331, the second dielectric film 332, and the third dielectric film 333 be from 0.1 g/m$^2$·24 hr (40° C., 90% RH) to 2.0 g/m$^2$·24 hr (40° C., 90% RH), more preferably, from 0.1 g/m$^2$·24 hr (40° C., 90% RH) to 1.0 g/m$^2$·24 hr (40° C., 90% RH). With this, a function as a water vapor barrier layer for suppressing or preventing the entry of moisture (water vapor) into the holographic element 310 can securely be exerted.

Note that, in this exemplary embodiment, description is made of the case where each of the first substrate 321 and the holographic element 310 has the flat upper surface and the flat lower surface being parallel flat plates. However, at least one of the first substrate 321 and the holographic element 310 may have any of or both of the upper surface and the lower surface being a curved surface.

Second Exemplary Embodiment

Next, a diffractive optical element 30 according to a second exemplary embodiment is described.

Figure 12:
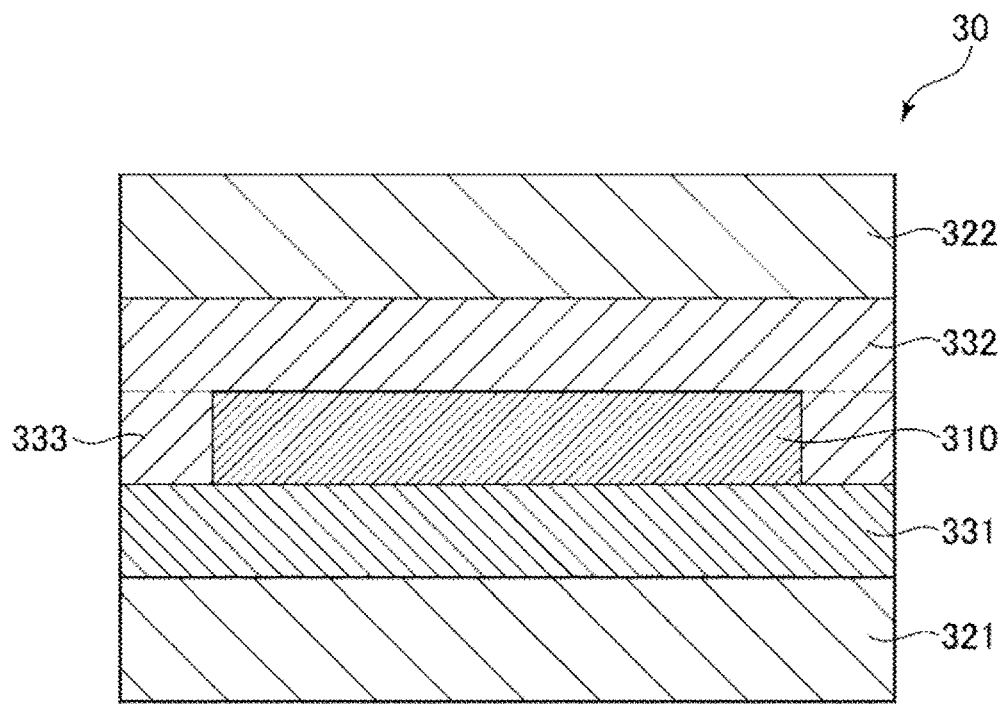
FIG. 12 is a longitudinal cross-sectional view for schematically illustrating a diffractive optical element according to a second exemplary embodiment of the invention.
Figure 13:
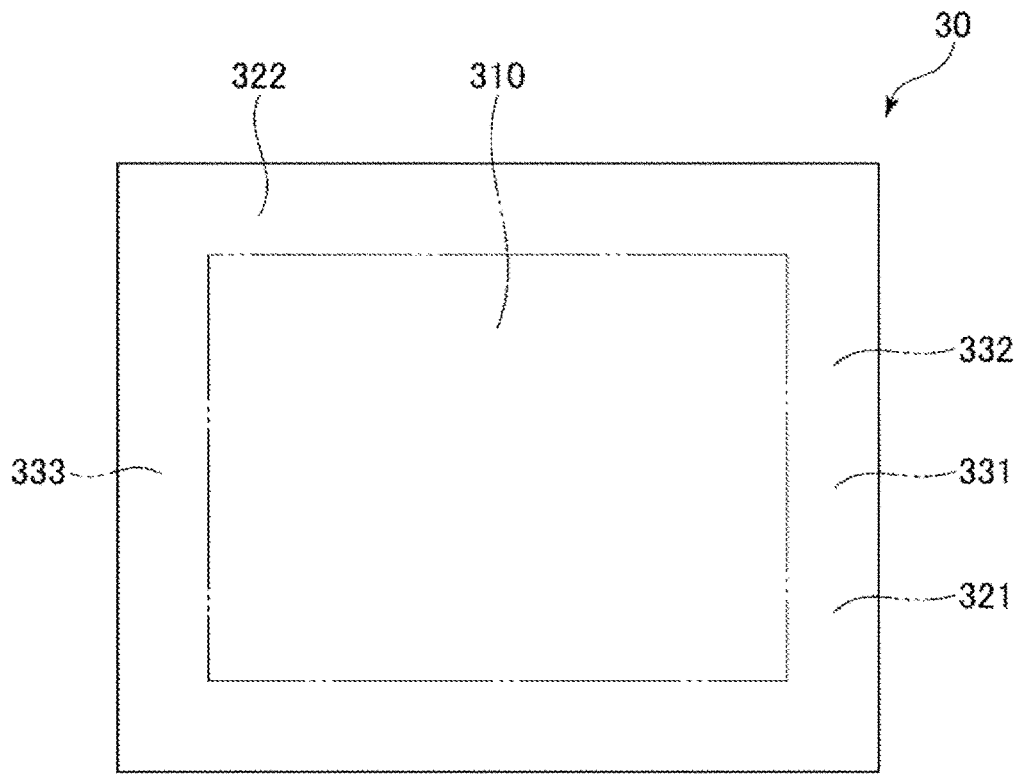
FIG. 13 is a plan view for schematically illustrating the diffractive optical element according to the second exemplary embodiment of the invention.

FIG. 12 is a longitudinal cross-sectional view for schematically illustrating the diffractive optical element according to the second exemplary embodiment of the invention. FIG. 13 is a plan view for schematically illustrating the diffractive optical element according to the second exemplary embodiment of the invention.

Now, differences between the diffractive optical element 30 according to the second exemplary embodiment and the above-mentioned diffractive optical element 30 according to the first exemplary embodiment are mainly described, and description on the same matters is omitted.

Further, the diffractive optical element 30 according to the second exemplary embodiment illustrated in FIG. 12 and FIG. 13 is the same as the diffractive optical element 30 according to the first exemplary embodiment except for the point that the diffractive optical element 30 according to the second exemplary embodiment includes a second substrate 322.

The second substrate 322 is provided on the upper surface side of the holographic element 310, and hence the second dielectric film 332 is arranged between the second substrate 322 and the holographic element 310. By providing the second substrate 322, the second substrate 322 exerts a function as a protection layer for protecting the second dielectric film 332, and thus, reliability of the diffractive optical element 30 can be improved.

As the second substrate 322, a substrate similar to the first substrate 321 may be used.

Note that, in a case where the virtual image display device according to the invention is applied to, for example, a virtual reality (VR) type head-mounted display and the second substrate 322 is not required to be transparent, the second substrate 322 may be a non-transparent substrate in place of a transparent substrate exemplified for the first substrate 321.

As the non-transparent substrate, for example, a substrate formed of a ceramic material such as alumina and a substrate obtained by forming an oxide film (insulating film) on a surface of a metal substrate such as stainless steel are exemplified.

Further, between the second substrate 322 and the second dielectric film 332, an adhesive layer having the same configuration as those of adhesive layers 341 to 343 described later may be provided.

Also with the diffractive optical element 30 according to the second exemplary embodiment, the same effects as those in the above-mentioned first exemplary embodiment can be obtained.

Third Exemplary Embodiment

Next, a diffractive optical element 30 according to a third exemplary embodiment is described.

Figure 14:
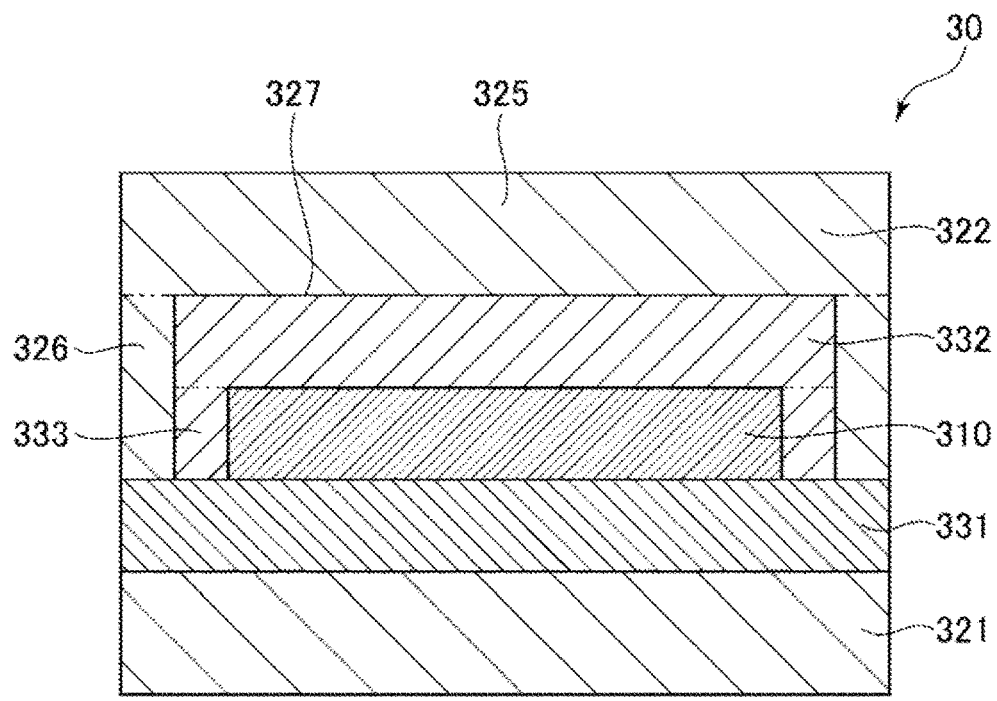
FIG. 14 is a longitudinal cross-sectional view for schematically illustrating a diffractive optical element according to a third exemplary embodiment of the invention.
Figure 15:
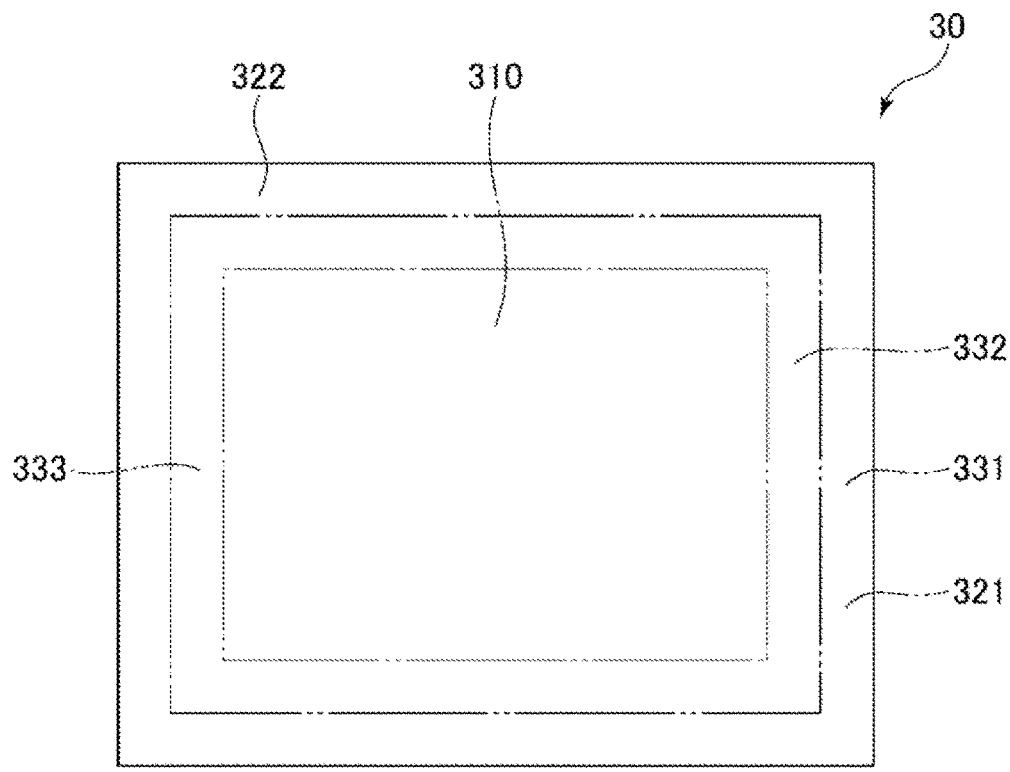
FIG. 15 is a plan view for schematically illustrating the diffractive optical element according to the third exemplary embodiment of the invention.

FIG. 14 is a longitudinal cross-sectional view for schematically illustrating the diffractive optical element according to the third exemplary embodiment of the invention. FIG. 15 is a plan view for schematically illustrating the diffractive optical element according to the third exemplary embodiment of the invention.

Now, differences between the diffractive optical element 30 according to the third exemplary embodiment and the above-mentioned diffractive optical element 30 according to the second exemplary embodiment are mainly described, and description on the same matters is omitted.

The diffractive optical element 30 according to the third exemplary embodiment illustrated in FIG. 14 and FIG. 15 is the same as the diffractive optical element 30 according to the second exemplary embodiment except for the point that the second substrate 322 included in the diffractive optical element 30 has a different configuration.

In this exemplary embodiment, the second substrate 322 includes a wall portion 326 standing upright along an edge portion on a lower surface side of a flat main body portion 325. In a recessed portion 327 defined by the main body portion 325 and the wall portion 326, the holographic element 310, the second dielectric film 332, and the third dielectric film 333 are stored. Thus, the second substrate 322 exerts a function as a protection layer for protecting not only the second dielectric film 332 but also the third dielectric film 333. Accordingly, reliability of the diffractive optical element 30 can further be improved.

Further, the second substrate 322 including the second dielectric film 332 and the third dielectric film 333, which are integrally provided on the upper surface and the inner peripheral surface of the recessed portion 327, respectively, is joined to the holographic element 310, which is placed on the first substrate 321 through intermediation of the first dielectric film 331, so that the holographic element 310 is stored in the recessed portion 327. In this manner, the diffractive optical element 30 according to this exemplary embodiment can be formed. Thus, the third dielectric film 333 can easily be formed on the side surface side of the holographic element 310.

Further, between the main body portion 325 of the second substrate 322 and the second dielectric film 332, between the wall portion 326 of the second substrate 322 and the third dielectric film 333, and further between the wall portion 326 of the second substrate 322 and the first dielectric film 331, adhesive layers having the same configurations as those of the adhesive layers 341 to 343 described later may be provided.

Also with the diffractive optical element 30 according to the third exemplary embodiment, the same effects as those in the above-mentioned first exemplary embodiment can be obtained.

Fourth Exemplary Embodiment

Next, a diffractive optical element 30 according to a fourth exemplary embodiment is described.

Figure 16:
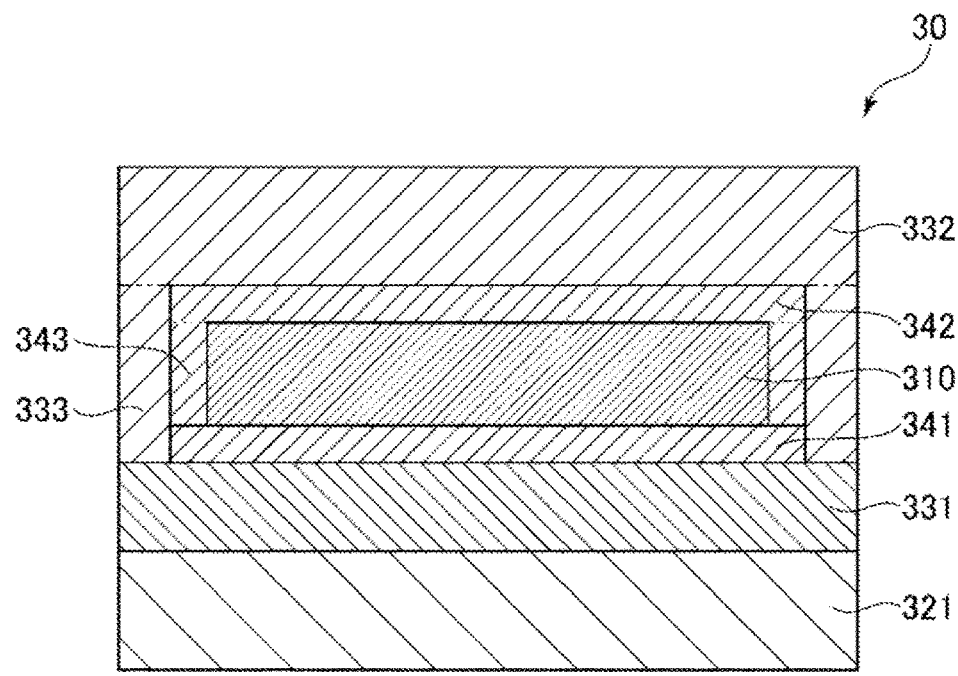
FIG. 16 is a longitudinal cross-sectional view for schematically illustrating a diffractive optical element according to a fourth exemplary embodiment of the invention.
Figure 17:
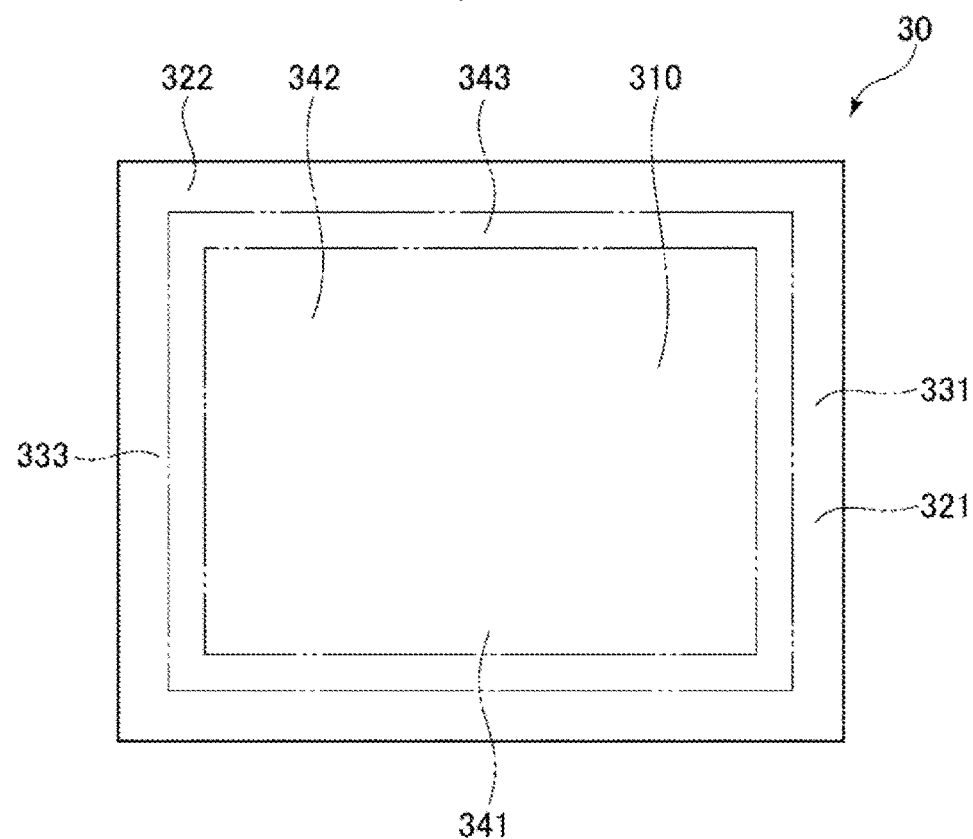
FIG. 17 is a plan view for schematically illustrating the diffractive optical element according to the fourth exemplary embodiment of the invention.

FIG. 16 is a longitudinal cross-sectional view for schematically illustrating the diffractive optical element according to the fourth exemplary embodiment of the invention. FIG. 17 is a plan view for schematically illustrating the diffractive optical element according to the fourth exemplary embodiment of the invention.

Now, differences between the diffractive optical element 30 according to the fourth exemplary embodiment and the above-mentioned diffractive optical element 30 according to the first exemplary embodiment are mainly described, and description on the same matters is omitted.

Further, the diffractive optical element 30 according to the fourth exemplary embodiment illustrated in FIG. 16 and FIG. 17 is the same as the diffractive optical element 30 according to the first exemplary embodiment except for the point that the diffractive optical element 30 according to the fourth exemplary embodiment includes the first adhesive layer 341, the second adhesive layer 342, and the third adhesive layer 343.

The first adhesive layer 341 is provided between the first dielectric film 331 and the holographic element 310. The second adhesive layer 342 is provided between the second dielectric film 332 and the holographic element 310. The third adhesive layer 343 is provided between the third dielectric film 333 and the holographic element 310. The second adhesive layer 342 and the third adhesive layer 343 are integrally formed. By providing the first adhesive layer 341, the second adhesive layer 342, and the third adhesive layer 343 formed in this manner, adhesion between the holographic element 310 and each of the first dielectric film 331, the second dielectric film 332, and the third dielectric film 333 through intermediation of the adhesive layers 341 to 343, respectively, can be improved.

The constituting materials of the adhesive layers 341 to 343 are not particularly limited as long as the constituting materials can provide the adhesive layers 341 to 343 with an adhesive property. However, there are exemplified transparent materials selected from, for example, an acrylic resin (adhesive agent), a silicon resin (adhesive agent), a polyester resin (adhesive agent), an urethane resin (adhesive agent), and a polyvinyl acetate resin (adhesive agent).

Further, the constituting material contained in the first dielectric film 331 and the constituting materials contained in the second dielectric film 332 and the third dielectric film 333 may be the same or different from each other.

Also with the diffractive optical element 30 according to the fourth exemplary embodiment, the same effects as those in the above-mentioned first exemplary embodiment can be obtained.

Note that, formation of at least one layer of the adhesive layers 341 to 343 in the laminated body may be omitted.

Fifth Exemplary Embodiment

Next, a diffractive optical element 30 according to a fifth exemplary embodiment is described.

Figure 18:
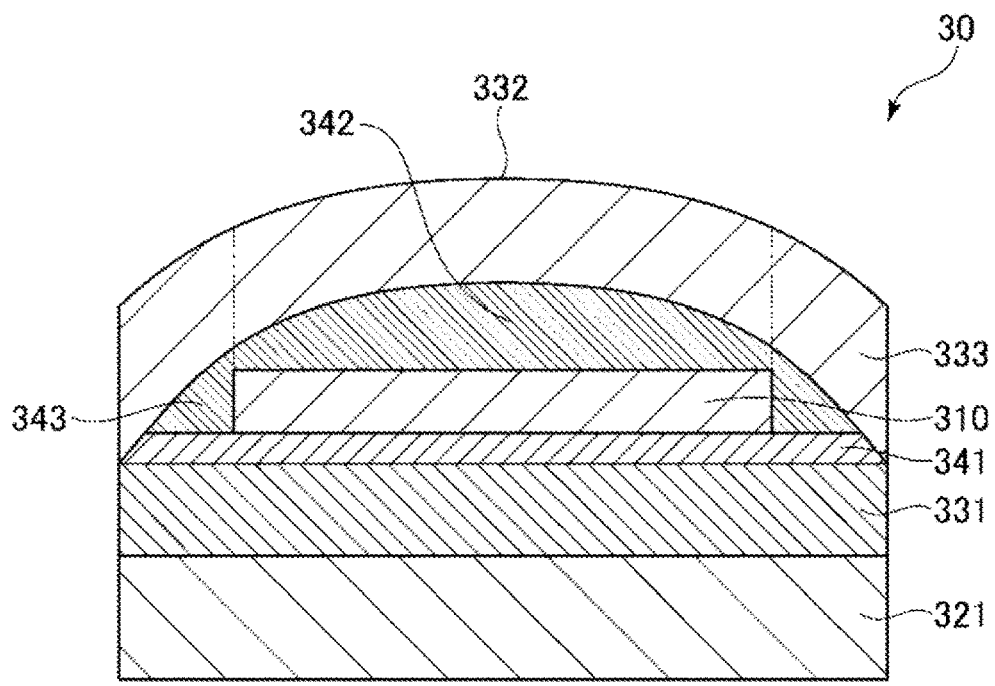
FIG. 18 is a longitudinal cross-sectional view for schematically illustrating a diffractive optical element according to a fifth exemplary embodiment of the invention.
Figure 19:
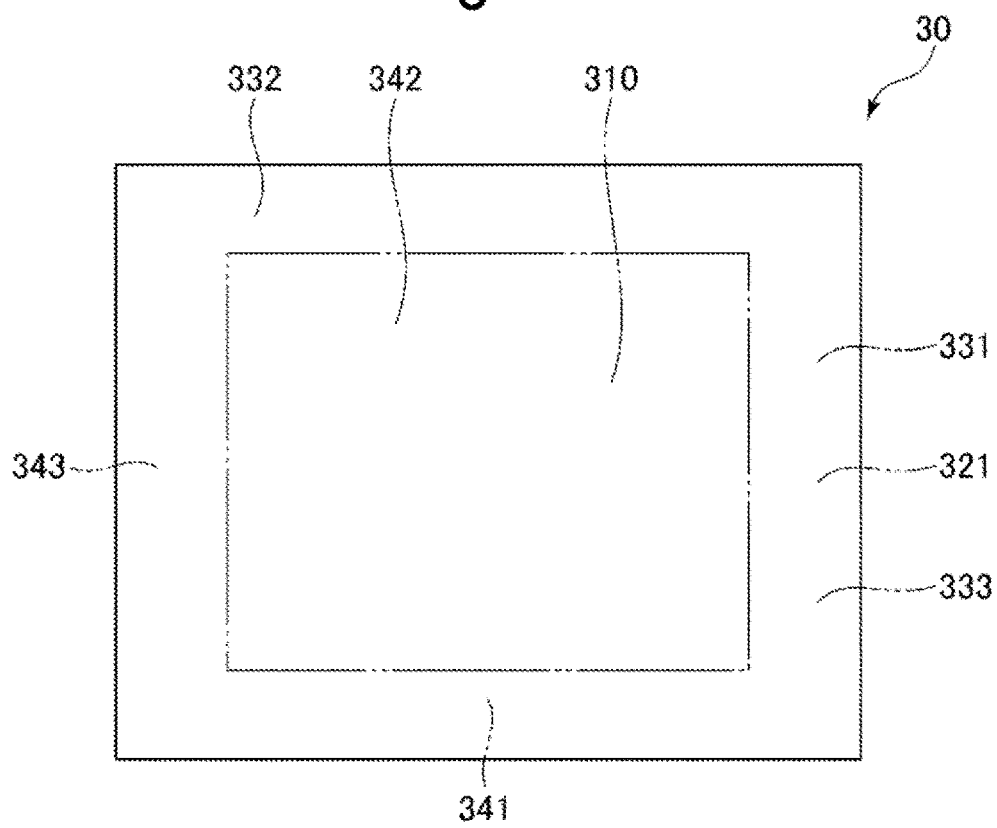
FIG. 19 is a plan view for schematically illustrating the diffractive optical element according to the fifth exemplary embodiment of the invention.

FIG. 18 is a longitudinal cross-sectional view for schematically illustrating the diffractive optical element according to the fifth exemplary embodiment of the present invention. FIG. 19 is a plan view for schematically illustrating the diffractive optical element according to the fifth exemplary embodiment of the invention.

Now, differences between the diffractive optical element 30 according to the fifth exemplary embodiment and the above-mentioned diffractive optical element 30 according to the fourth exemplary embodiment are mainly described, and description on the same matters is omitted.

The diffractive optical element 30 according to the fifth exemplary embodiment illustrated in FIG. 18 and FIG. 19 is the same as the diffractive optical element 30 according to the fourth exemplary embodiment except for the point in that the second adhesive layer 342, the third adhesive layer 343, the second dielectric film 332, and the third dielectric film 333 have different configurations.

The second adhesive layer 342 and the third adhesive layer 343 are integrally provided so as to be gradually reduced in thickness as approaching the edge portion from the central portion. Further, the second dielectric film 332 and the third dielectric film 333, which have a curved shape, are integrally provided so as to cover the second adhesive layer 342 and the third adhesive layer 343, respectively. By forming the second adhesive layer 342 and the third adhesive layer 343, which have such configurations, the second dielectric film 332 and the third dielectric film 333, which have a curved shape, can be formed relatively easily on the upper surface side of the second adhesive layer 342 and the third adhesive layer 343 by the above-mentioned vapor growth method.

Also with the diffractive optical element 30 according to the fifth exemplary embodiment, the same effects as those in the above-mentioned first exemplary embodiment can be obtained.

Sixth Exemplary Embodiment

Next, a diffractive optical element 30 according to a sixth exemplary embodiment is described.

Figure 20:
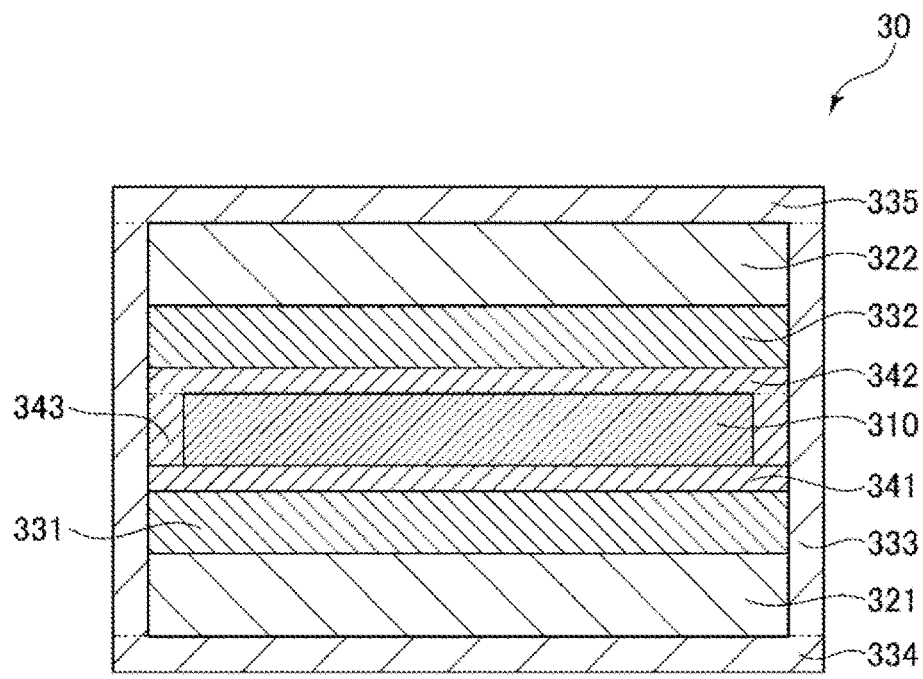
FIG. 20 is a longitudinal cross-sectional view for schematically illustrating a diffractive optical element according to a sixth exemplary embodiment of the invention.
Figure 21:
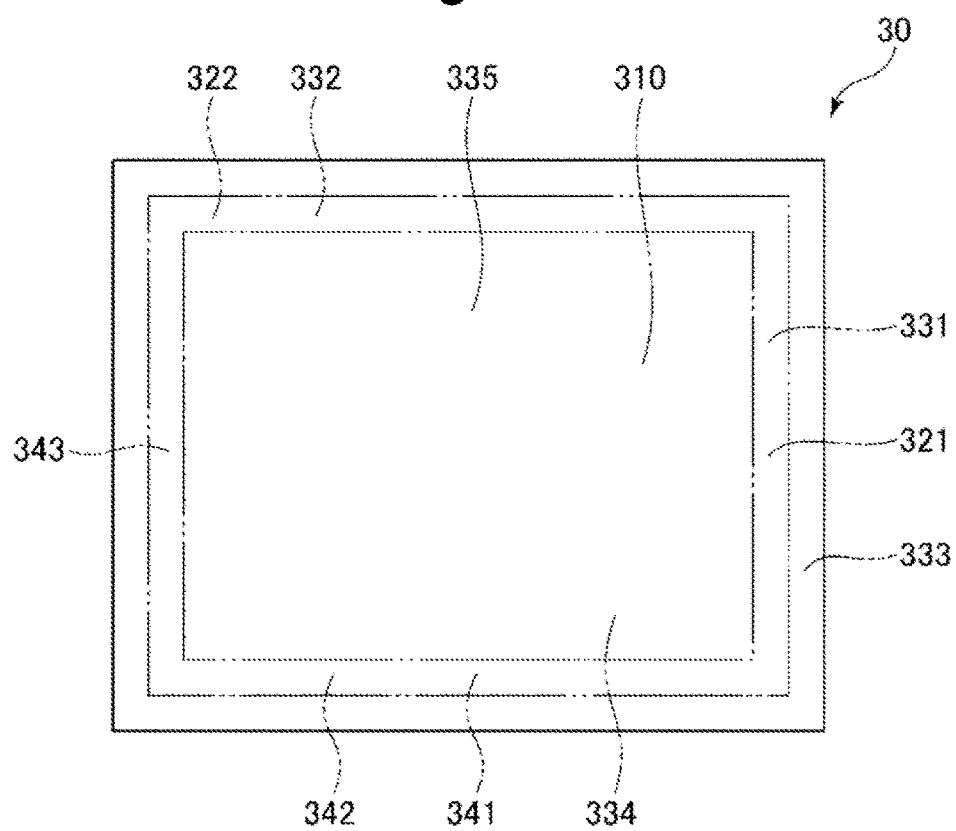
FIG. 21 is a plan view for schematically illustrating the diffractive optical element according to the sixth exemplary embodiment of the invention.

FIG. 20 is a longitudinal cross-sectional view for schematically illustrating the diffractive optical element according to the sixth exemplary embodiment of the invention. FIG. 21 is a plan view for schematically illustrating the diffractive optical element according to the sixth exemplary embodiment of the invention.

Now, differences between the diffractive optical element 30 according to the sixth exemplary embodiment and the above-mentioned diffractive optical element 30 according to the fourth exemplary embodiment are mainly described, and description on the same matters is omitted.

The diffractive optical element 30 according to the sixth exemplary embodiment illustrated in FIG. 20 and FIG. 21 is the same as the diffractive optical element 30 according to the fourth exemplary embodiment except for the point in that the diffractive optical element 30 according to the sixth exemplary embodiment includes the second substrate 322, a fourth dielectric film 334, a fifth dielectric film 335, and the third dielectric film 333, which is formed integrally with the fourth dielectric film 334 and the fifth dielectric film 335 in place of the second dielectric film 332.

The second substrate 322 is provided on the upper surface side of the holographic element 310, and the fifth dielectric film 335 is provided on the upper surface side of the second substrate 322. Further, the fourth dielectric film 334 is provided on the lower surface side of the first substrate 321. Further, in this exemplary embodiment, the third dielectric film 333 is not integrally formed with the second dielectric film 332, and is integrally formed with the fifth dielectric film 335 positioned on the upper surface side of the second substrate 322 and the fourth dielectric film 334 positioned on the lower surface side of the first substrate 321.

With this structure, all the surfaces of the laminated body (the upper surface, the lower surface, and the side surfaces of the laminated body), which includes the holographic element 310, the first dielectric film 331, the first substrate 321, the second dielectric film 332, the second substrate 322, and the adhesive layers 341 to 343 are covered with the third dielectric film 333, the fourth dielectric film 334, and the fifth dielectric film 335, which are integrally formed. Thus, the side surface sides of the laminated body are covered with the third dielectric film 333. As a result, the side surface side of the holographic element 310 are covered with the third dielectric film 333 through intermediation of the third adhesive layer 343.

The third dielectric film 333, the fourth dielectric film 334, and the fifth dielectric film 335 have the same configuration as the configuration of the first dielectric film 331 described in the above-mentioned first exemplary embodiment. However, in addition to a function as a water vapor barrier layer, a function as an anti-reflection film may be provided.

In a case where the third dielectric film 333, the fourth dielectric film 334, and the fifth dielectric film 335 are provided with a function as an anti-reflection film, it is preferred that those films be multi-layer bodies formed of ceramic materials. Specifically, for example, there is exemplified a multi-layer body, which includes a layer formed of silicon monoxide (SiO), a layer formed of zirconia ($ZrO_2$), a layer formed of silica ($SiO_2$), a layer formed of titania ($TiO_2$), a layer formed of zirconia ($ZrO_2$), and a layer formed of silica ($SiO_2$), and the layer formed of silicon monoxide (SiO) is on the substrate side.

Further, in this case, the average thickness of each of the third dielectric film 333, the fourth dielectric film 334, and the fifth dielectric film 335 is suitably set so as to exert a function as an anti-reflection film, and it is preferred that the thickness be, for example, from approximately 100 nm to 500 nm, and more preferably, approximately from 300 nm to 500 nm.

Also with the diffractive optical element 30 according to the sixth exemplary embodiment, the same effects as those in the above-mentioned first exemplary embodiment can be obtained.

Note that, formation of at least one layer of the adhesive layers 341 to 343 in the laminated body may be omitted.

Seventh Exemplary Embodiment

Next, a diffractive optical element 30 according to a seventh exemplary embodiment is described.

Figure 22:
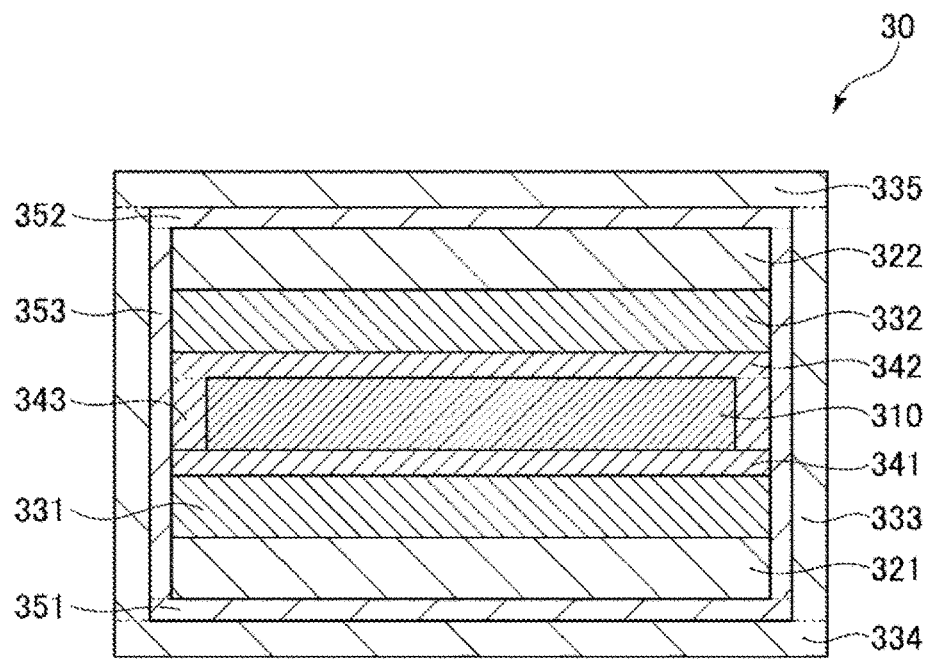
FIG. 22 is a longitudinal cross-sectional view for schematically illustrating a diffractive optical element according to a seventh exemplary embodiment of the invention.
Figure 23:
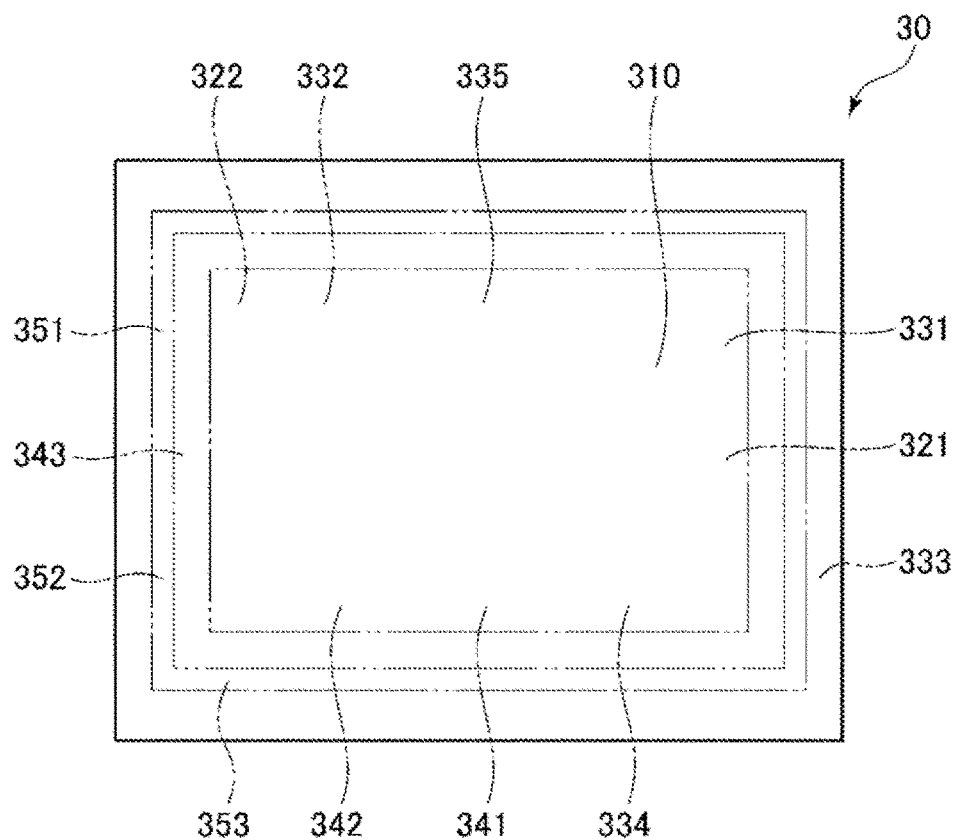
FIG. 23 is a plan view for schematically illustrating the diffractive optical element according to the seventh exemplary embodiment of the invention.

FIG. 22 is a longitudinal cross-sectional view for schematically illustrating the diffractive optical element according to the seventh exemplary embodiment of the present invention. FIG. 23 is a plan view for schematically illustrating the diffractive optical element according to the seventh exemplary embodiment of the invention.

Now, differences between the diffractive optical element 30 according to the seventh exemplary embodiment and the above-mentioned diffractive optical element 30 according to the sixth exemplary embodiment are mainly described, and description on the same matters is omitted.

The diffractive optical element 30 according to the seventh exemplary embodiment illustrated in FIG. 22 and FIG. 23 is the same as the diffractive optical element 30 according to the sixth exemplary embodiment except for the point in that the diffractive optical element 30 according to the seventh exemplary embodiment includes a first hard coat layer 351, a second hard coat layer 352, and a third hard coat layer 353.

The first hard coat layer 351 is provided on the lower surface side of the laminated body, that is, between the first substrate 321 and the fourth dielectric film 334. The second hard coat layer 352 is provided on the upper surface side of the laminated body, that is, between the second substrate 322 and the fifth dielectric film 335. The third hard coat layer 353 is provided between the side surface sides of the laminated body and the third dielectric film 333. Further, the first hard coat layer 351, the second hard coat layer 352, and the third hard coat layer 353 are integrally provided so as to cover all the surfaces of the laminated body, and the laminated body are covered with the third dielectric film 333, the fourth dielectric film 334, and the fifth dielectric film 335. The hard coat layers 351 to 353 are interposed between the laminated body and the dielectric films 333 to 335. Accordingly, adhesiveness between the laminated body and the dielectric films 333 to 335 through intermediation with the hard coat layers 351 to 353 can be improved.

The hard coat layers 351 to 353 contain a resin material, and may be formed through use of a composition (hard coat material) containing, for example, an organic silicon compound (silane coupling agent) and metallic oxides.

The organic silicon compound is not particularly limited. However, the organic silicon compound, which is expressed in, for example, General Expression (1): $(R^1)_n Si(X^1)_{4-n}$ (in General Expression (1), $R^1$, $X^1$, and n indicate an organic group including two or more carbons having a polymerizable functional group, a hydrolyzable group, and an integer of 1 or 2, respectively), is used.

Further, the metallic oxides are not particularly limited. However, for example, the oxides of metal such as Al, Ti, Sb, Zr, Si, Ce, Fe, In, Sn, and Zn are exemplified, and one, two or more kinds of those oxides may be used in combination. Of those, particularly, $TiO_2$, $ZrO_2$, $CeO_2$, $ZnO_2$, $SnO_2$, and ITO (indium-tin compound oxide) are preferred. The amounts of those metallic oxides contained in the hard coat layers 351 to 353 are suitably set so that the refractive indexes of the hard coat layers 351 to 353 can be set to have desired indexes.

Further, it is preferred that the average thickness of each of the hard coat layers 351 to 353 be, for example, approximately from 1 µm to 50 µm, and more preferably, approximately from 5 µm to 30 µm.

Note that, the hard coat layers 351 to 353 may be formed by supplying a liquid composition (hard coat material) to the laminated body and then performing drying. Further, as a method of supplying the composition to the laminated body, for example, a method of immersing the laminated body in the composition (immersion method), a method of showering (atomizing) the composition on the laminated body (atomization method), and a method of applying the composition to the laminated body (application method) are exemplified. Of all, the immersion method is preferred. With this, the hard coat layers 351 to 353 each having a uniform thickness can be formed simultaneously.

Further, in addition to organic silicon compound and the metallic oxides, the composition (hard coat material) may contain an ultraviolet-curable type curative agent. In this case, the hard coat layers 351 to 353 can be formed by drying the liquid composition on the laminated body and then irradiating the composition with UV light.

Further, a liquid repelling film formed of, for example, a fluorine-based material and a silicon-based material may be formed on the surfaces (outermost peripheries) of the fourth dielectric film 334, the fifth dielectric film 335, and the third dielectric film 333. With this, a liquid resistance property of the diffractive optical element 30 against water and the like can be improved.

Also with the diffractive optical element 30 according to the seventh exemplary embodiment, the same effects as those in the above-mentioned first exemplary embodiment can be obtained.

Description is made of the diffractive optical element and the virtual image display device according to the invention based on the illustrated exemplary embodiments. However, the invention is not limited to these exemplary embodiments.

For example, in the diffractive optical element according to the invention, an arbitrary layer may be provided between the layers included in the diffractive optical element. Specifically, a resin layer or the like formed of a thermoplastic resin such as polyethylene terephthalate, polycarbonate, polyamide, triacetylcellulose may be formed so as to be interposed between the second dielectric film and the upper surface of the holographic element included in the diffractive optical element.

Further, in each of the above-mentioned exemplary embodiments, description is made of the case where the light having entered through the first substrate and the first dielectric film is deflect (reflected). However, the invention is not limited thereto. In a case where the holographic element is inverted upside down so as to be placed on the first substrate through intermediation of the first dielectric film, also the light having entered from the opposite side of the first substrate can be deflected.

Further, in the above-mentioned exemplary embodiments, as an example, description is made of the case where the virtual image display device (image display device) including the diffractive optical element according to the invention is applied to the head-mounted display (HMD). However, the invention is not limited thereto. The virtual image display device including the diffractive optical element according to the invention may also be applied to a head-up display fixed to an object and a binocular type hand-held display.

Further, as described in the above-mentioned exemplary embodiments, in a case where the virtual image display device according to the invention is applied to an augmented reality (AR) type head-mounted display including a visual recognition unit being light transmissive, each of the components forming the diffractive optical element according to the invention is required to be light transmissive (transparent). However, in a case where the virtual image display device according to the invention is applied to a virtual reality (VR) type head-mounted display or the like including a visual recognition unit, which is not required to be light transmissive, the components forming the diffractive optical element according to the invention, which are not light transmissive, may be used.

Further, in the above-mentioned exemplary embodiments, description is made of the case where the third dielectric film is formed on all the side surfaces (all the four surfaces) of the holographic element. However, the invention is not limited thereto, and formation of a part of the film may be omitted.

The entire disclosure of Japanese Patent Application No. 2018-034415, filed Feb. 28, 2018 is expressly incorporated by reference herein.

What is claimed is:
1. A diffractive optical element comprising:
a holographic element configured to deflect incident light;
a first substrate provided on one surface side of the holographic element;
a first dielectric film provided between the first substrate and the holographic element;
a second dielectric film provided on an other surface side of the holographic element;
a third dielectric film provided on a side surface side of the holographic element;
a second substrate provided on the other surface side of the holographic element,
a fourth dielectric film provided on the one surface side of the first substrate; and
a fifth dielectric film provided on a surface side of the second substrate farthest from the first substrate, wherein
the third dielectric film, the fourth dielectric film, and the fifth dielectric film are formed as a same layer,
the third dielectric film, the fourth dielectric film, and the fifth dielectric film, which are formed as a same layer, cover all surfaces of a laminated body including the holographic element, the first dielectric film, the first substrate, the second dielectric film, and the second substrate, and
the second dielectric film is arranged between the second substrate and the holographic element.

2. The diffractive optical element according to claim 1, further comprising:
a first hard coat layer provided between the first substrate and the fourth dielectric film;
a second hard coat layer provided between the second substrate and the fifth dielectric film; and
a third hard coat layer provided between a side surface side of the laminated body and the third dielectric film.

3. A virtual image display device comprising:
an image formation unit emitting an image light; and
the diffractive optical element according to claim 1, wherein the holographic element is configured to deflect the image light.

4. The virtual image display device according to claim 3, wherein
the image formation unit comprises a light source and a scanning mirror.

5. The virtual image display device according to claim 3, wherein
the image formation unit comprises an image display element.

* * * * *